United States Patent
Coker et al.

(10) Patent No.: US 8,576,511 B1
(45) Date of Patent: Nov. 5, 2013

(54) DISK DRIVE EXECUTING LOG STRUCTURED WRITES TO PHYSICAL ZONES BASED ON POWER MODE

(75) Inventors: Kenny T. Coker, Firestone, CO (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 321 days.

(21) Appl. No.: 13/165,727

(22) Filed: Jun. 21, 2011

Related U.S. Application Data

(60) Provisional application No. 61/377,061, filed on Aug. 25, 2010.

(51) Int. Cl.
*G11B 5/596* (2006.01)
*G11B 21/02* (2006.01)

(52) U.S. Cl.
USPC ....... 360/78.04; 360/78.08; 360/75; 711/112; 711/202

(58) Field of Classification Search
None
See application file for complete search history.

(56) References Cited

U.S. PATENT DOCUMENTS

| | | | |
|---|---|---|---|
| 5,787,292 A | 7/1998 | Ottesen et al. | |
| 5,937,435 A * | 8/1999 | Dobbek et al. | 711/202 |
| 7,412,585 B2 | 8/2008 | Uemura | |
| 7,551,383 B1 | 6/2009 | Kupferman | |
| 7,596,392 B2 | 9/2009 | Makela et al. | |
| 2002/0095546 A1 * | 7/2002 | Dimitri et al. | 711/112 |

\* cited by examiner

*Primary Examiner* — Andrew L Sniezek

(57) ABSTRACT

A disk drive is disclosed comprising a head actuated over a disk comprising a plurality of physical zones including a first physical zone and a second physical zone, wherein the first physical zone comprises data tracks recorded at a first data rate and the second physical zone comprises data tracks recorded at a second data rate different than the first data rate. A write command is received including data and at least one logical block address (LBA). One of the first and second physical zones is selected based on a power parameter affecting a power consumption of the disk drive, and the data is written to a data sector in the selected physical zone. A physical block address (PBA) is assigned to the data sector, and an LBA to PBA map is updated for the written data.

24 Claims, 5 Drawing Sheets

US 8,576,511 B1

DISK DRIVE EXECUTING LOG STRUCTURED WRITES TO PHYSICAL ZONES BASED ON POWER MODE

CROSS-REFERENCE TO RELATED APPLICATIONS

The present application claims priority from provisional U.S. Patent Application Ser. No. 61/377,061, filed on Aug. 25, 2010, the specification of which is incorporated herein by reference.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together to form a plurality of zones.

The prior art disk format of FIG. 1 also comprises a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

DETAILED DESCRIPTION OF EMBODIMENTS OF THE INVENTION

Figure 1:
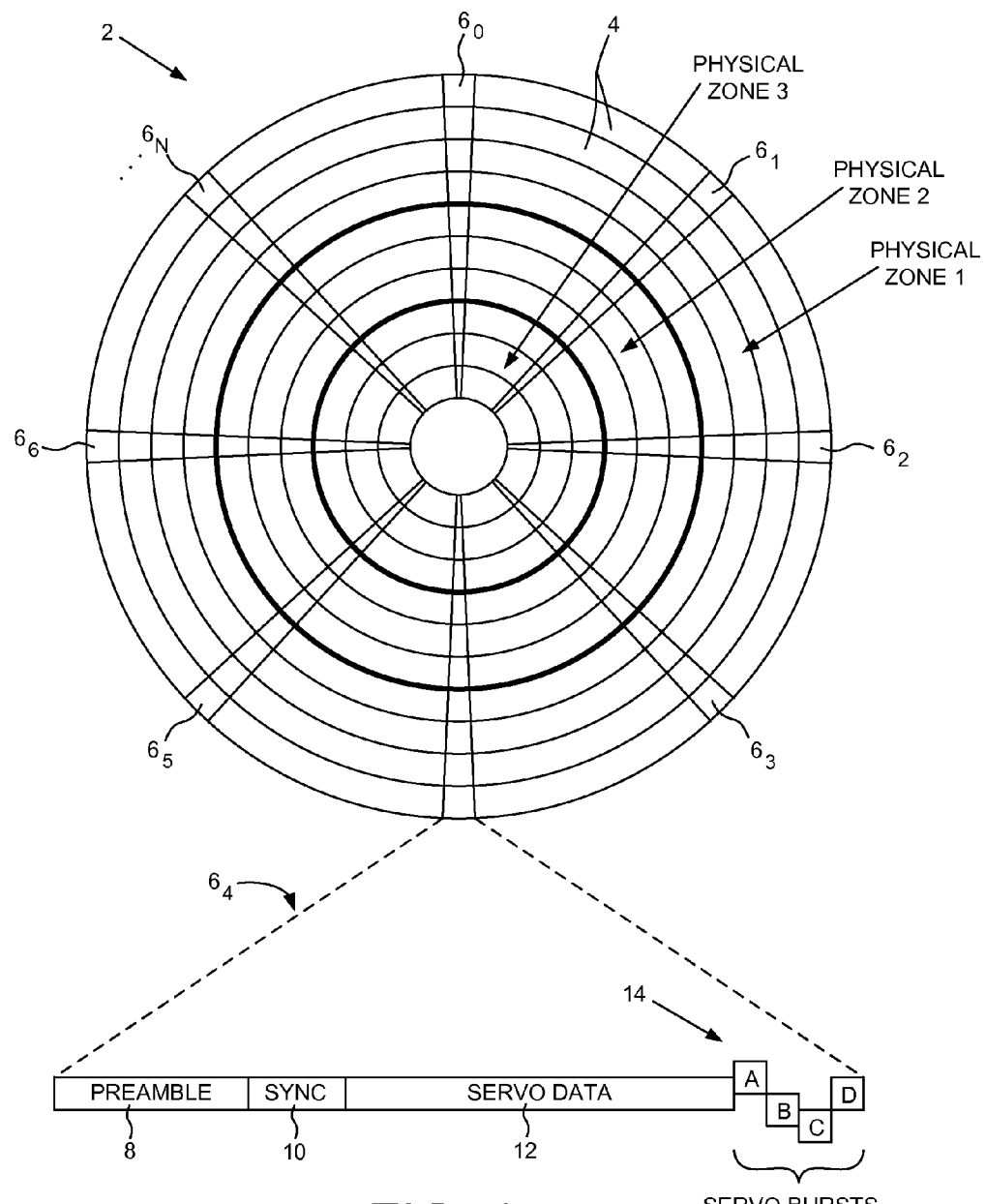
FIG. 1 shows a prior art disk format comprising a plurality of servo sectors that define a plurality of data tracks, wherein the data tracks are recorded at a varying data rate based on a physical zone.
Figure 2:
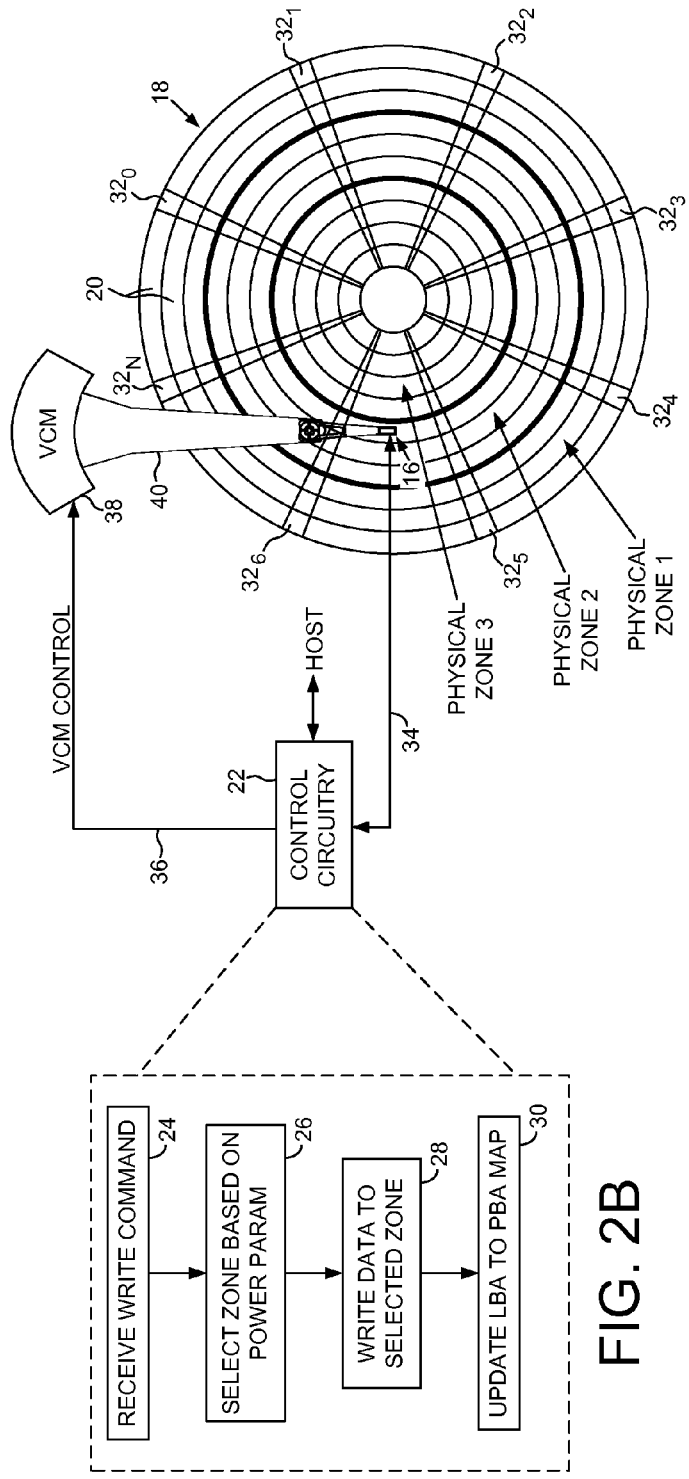
FIG. 2A shows a disk drive according to an embodiment of the present invention comprising a head actuated over a disk and control circuitry.
FIG. 2B is a flow diagram according to an embodiment of the present invention wherein data of a write command is written to a selected physical zone based on a power parameter of the disk drive.
FIG. 2C shows an embodiment of the present invention wherein each physical zone comprises at least one circular buffer.

FIG. 2A shows a disk drive according to an embodiment of the present invention comprising a head 16 actuated over a disk 18 comprising a plurality of physical zones including a first physical zone and a second physical zone, wherein the first physical zone comprises data tracks 20 recorded at a first data rate and the second physical zone comprises data tracks recorded at a second data rate different than the first data rate. The disk drive further comprises control circuitry 22 operable to execute the flow diagram of FIG. 2B, wherein a write command is received including data and at least one logical block address (LBA) (step 24). One of the first and second physical zones is selected based on a power parameter affecting a power consumption of the disk drive (step 26), and the data is written to a data sector in the selected physical zone (step 28). A physical block address (PBA) is assigned to the data sector, and an LBA to PBA map is updated for the written data (step 30).

The disk 18 shown in the embodiment of FIG. 2A comprises a plurality of servo sectors $32_0$-$32_N$ that define the data tracks 20. The control circuitry 22 processes a read signal 34 emanating from the head 16 to demodulate the servo sectors $32_0$-$32_N$ into a position error signal (PES) representing a position error of the head relative to a target data track. The control circuitry 22 comprises a servo compensator for filtering the PES to generate a control signal 36 applied to a voice coil motor (VCM) 38 that rotates an actuator arm 40 about a pivot in order to actuate the head 16 radially over the disk 18 in a direction that reduces the PES.

Any suitable dynamic LBA to PBA mapping technique may be employed in the embodiments of the present invention wherein the LBAs of write commands are dynamically mapped to PBAs of data sectors when the write commands are executed (log structured writes). Dynamic LBA mapping enables the data of write commands to be written to any of the physical zones as compared to static LBA mapping wherein the LBA to PBA mapping is predetermined. FIG. 2C shows an embodiment of the present invention wherein each physical zone comprises at least one circular buffer for implementing the LBA dynamic mapping, wherein the data of a write command is written to the data sectors at a head of the circular buffer (CBH). As LBAs are overwritten, the previously written data sectors are invalidated, and during a garbage collection operation, valid data sectors at the tail of the circular buffer are relocated to the head of the circular buffer so that the tail of the circular buffer may eventually be overwritten.

Figure 3:
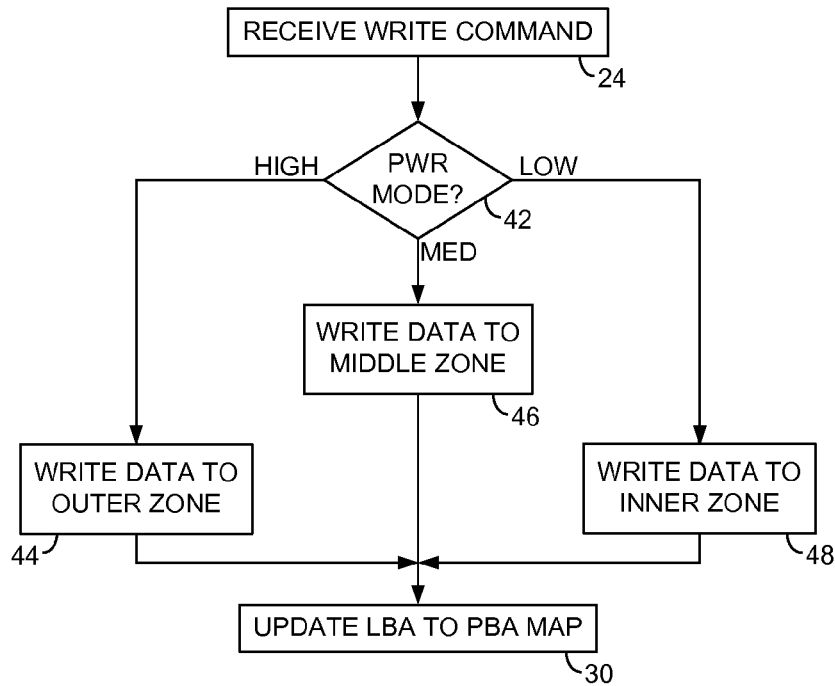
FIG. 3 is a flow diagram according to an embodiment of the present invention wherein the power parameter comprises a power mode.

Any suitable power parameter may be evaluated to select a physical zone to write the data of a write command. In an embodiment shown in FIG. 3, the power parameter comprises a power mode (step 42) including a high power mode, medium power mode, and low power mode. For example, the high power mode may correspond to a non-battery operating mode, and the low power mode may correspond to a battery operating mode. In one embodiment, the high power mode provides the highest performance while consuming the most power, whereas the low power mode provides the least performance while consuming less power. Accordingly, in the embodiment of FIG. 3, when in the high power mode data is written to the outer diameter physical zone (step 44) where the data rate is the highest (because the linear velocity of the data tracks are the highest). When in the medium power mode data is written to a middle diameter physical zone (step 46), and when in the low power mode data is written to the inner diameter physical zone (step 48) where the data rate is the lowest (because the linear velocity of the data tracks is the lowest).

Figure 4:
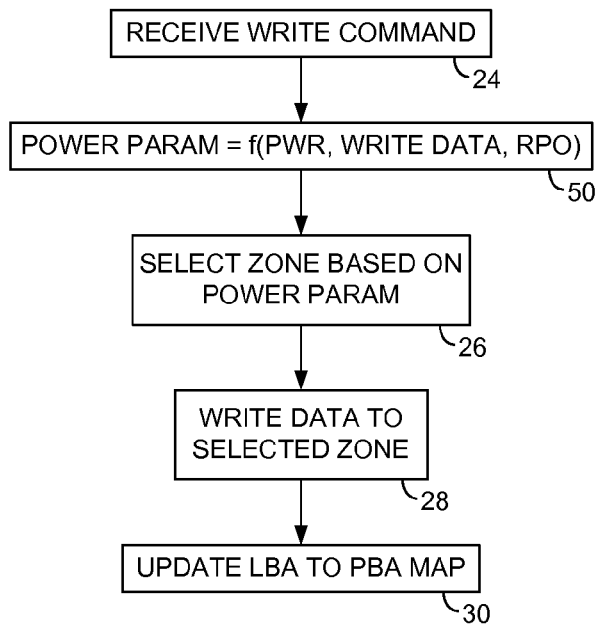
FIG. 4 is a flow diagram according to an embodiment of the present invention wherein the power parameter is based on a power mode, an amount of data in the write command, and rotational position optimization (RPO) parameters, such as a seek distance of the head.

FIG. 4 is a flow diagram according to an embodiment of the present invention wherein the power parameter is computed (step 50) as a function of a power mode, an amount of data in a write command, and parameters of a rotational position optimization (RPO) algorithm, such as the seek distance of the head needed to reach each physical zone. For example, when in a high power mode, the data may be written at the outer diameter physical zone as long as a target performance can be attained relative to the seek distance and amount of data in the write command. For example, if the seek distance to reach the outer diameter physical zone is excessive, the seek may be avoided unless there is a large amount of data in the write command. If there is a large amount of data in the write command, the performance gain provided by the higher data rate of the outer diameter physical zone outweighs the performance loss of a longer seek. Similarly, when in a low power mode, the data may be written to the inner diameter physical zone as long as a power savings is attained relative to the seek distance and the amount of data in the write command. If there is a large amount of data in the write command, the power savings of the lower data rate of the inner diameter physical zone outweighs the power consumed by a longer seek.

FIGS. 5A-5F show several examples of selecting a physical zone to service a write command based on the seek distance and amount of data in the write command. In the embodiments shown, dynamic LBA mapping is implemented using a single circular buffer within each physical zone. However, any suitable technique for dynamic LBA mapping may be employed. In addition, other embodiments may employ more than one circular buffer within each physical zone.

Figure 5A:
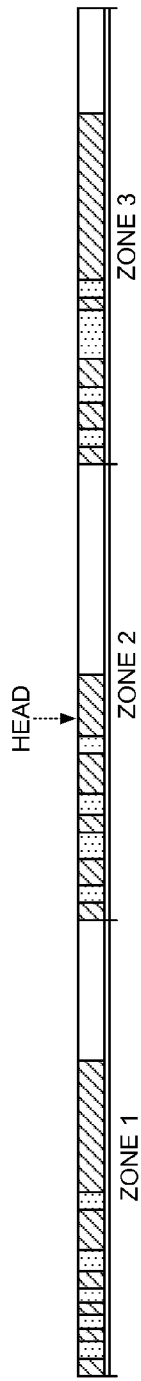
FIGS. 5A-5F illustrate embodiments of the present invention wherein the physical zone is selected based on an amount of data in the write command and a seek distance of the head.
Figure 5B:
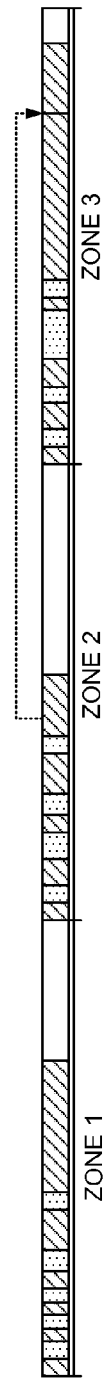
Figure 5C:
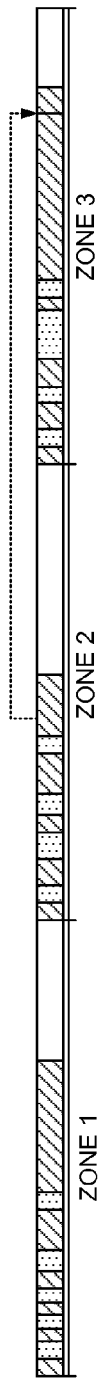
Figure 5D:
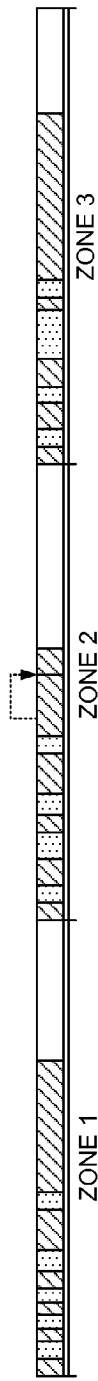

FIG. 5A shows an example state of the physical zones and a location of the head when a write command is received from the host. FIG. 5B shows the inner diameter physical zone selected to service a write command based on the power parameter computed as a function of a low power mode and a seek distance relative to the amount of data in the write command. In this example, the amount of power consumed by seeking to the head of the circular buffer in the inner diameter physical zone is outweighed by the power savings realized from writing the large amount of data in the write command at a lower data rate. That is, the net effect is a power savings. In contrast, the example of FIG. 5C shows that a long seek with a small amount of data to be written will result in a consumption of more power as compared to writing the data to the current physical zone as illustrated in FIG. 5D. In FIG. 5D, the power saved by executing a shorter seek outweighs the power consumed by writing the data at a higher data rate. Accordingly, in one embodiment different power parameters are computed based on the seek distance and amount of data for each physical zone, and the physical zone providing the best power/performance level is selected for servicing the write command.

Figure 5E:
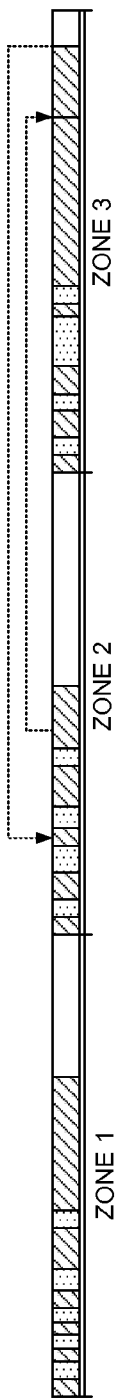
Figure 5F:
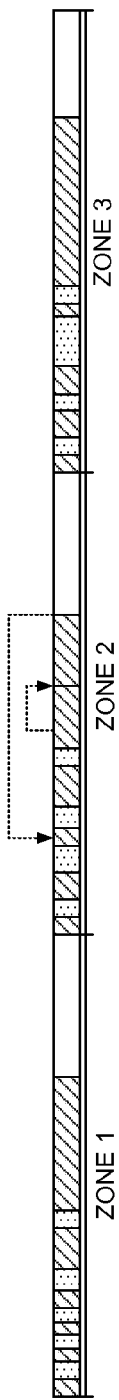

FIGS. 5E and 5F illustrate an example wherein the power parameter is computed based on a third seek distance associated with executing a disk access command after executing the write command. In FIG. 5E, the third seek distance corresponds to a read command in the middle diameter physical zone. Accordingly, if the inner diameter physical zone were selected to service the write command, the power consumed by first seeking to the inner diameter physical zone and then back to the middle diameter physical zone may outweigh the power saved by writing the data at the lower data rate of the inner diameter physical zone. Therefore, instead of writing the data to the inner diameter physical zone, as illustrated in FIG. 5F the data is written to the middle diameter physical zone (at the higher data rate) so that less power is consumed by executing a shorter seek for the subsequent read command. A similar example may apply for a high power mode wherein executing shorter seeks and writing at a lower data rate may provide better performance than seeking to the outer diameter physical zone to write at the higher data rate and then seeking back to the middle diameter physical zone to execute the subsequent read command.

Figure 6:
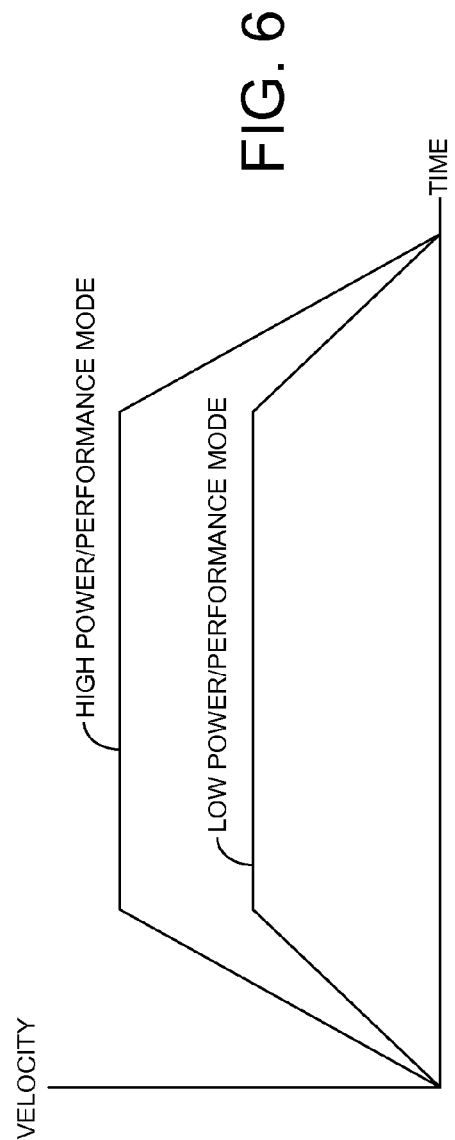
FIG. 6 shows an embodiment of the present invention wherein the power parameter may be based on a seek profile associated with executing disk access commands.

FIG. 6 shows an embodiment of the present invention wherein a seek profile of the head may be adjusted based on a power mode or to reduce acoustic noise in the disk drive. For example, the seek profile of the head may be adjusted so as to reduce the maximum seek velocity as illustrated in FIG. 6 thereby reducing the amount of power consumed during seek operations. In one embodiment of the present invention, the power parameter for selecting the physical zone to service a write command is based on the seek profile of the head and corresponding power consumed for a given seek distance. In other embodiments, the rotation speed of the disk (and corresponding data rates of the physical zones) may vary based on an operating mode of the disk drive, which may have a corresponding affect on the computed power parameter.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of physical zones including a first physical zone and a second physical zone, wherein the first physical zone comprises data tracks recorded at a first data rate and the second physical zone comprises data tracks recorded at a second data rate different than the first data rate;
   a head actuated over the disk; and
   control circuitry operable to:
      receive a write command including data and at least one logical block address (LBA);
      select one of the first and second physical zones based on a power parameter affecting a power consumption of the disk drive;
      write the data to a data sector in the selected physical zone, wherein a physical block address (PBA) is assigned to the data sector; and
      update an LBA to PBA map for the written data.

2. The disk drive as recited in claim 1, wherein:
   the power parameter comprises a high power mode and a low power mode;
   the control circuitry is operable to select the first physical zone for the high power mode; and
   the control circuitry is operable to select the second physical zone for the low power mode in order to consume less power.

3. The disk drive as recited in claim 2, wherein:
   the high power mode corresponds to a non-battery operating mode; and
   the low power mode corresponds to a battery operating mode.

4. The disk drive as recited in claim 2, wherein the first data rate is higher than the second data rate.

5. The disk drive as recited in claim 4, wherein:
   the first physical zone is located toward an outer diameter of the disk; and
   the second physical zone is located toward an inner diameter of the disk.

6. The disk drive as recited in claim 1, wherein the control circuitry is further operable to determine the power parameter based on an amount of the data in the write command.

7. The disk drive as recited in claim 1, wherein the control circuitry is further operable to determine the power parameter based on a seek distance of the head.

8. The disk drive as recited in claim 1, wherein the control circuitry is further operable to determine the power parameter based on a seek profile of the head.

9. The disk drive as recited in claim 7, wherein the control circuitry is further operable to determine the power parameter by:
   determining a first seek distance associated with writing the data to the first physical zone; and
   determining a second seek distance associated with writing the data to the second physical zone.

10. The disk drive as recited in claim 9, wherein the control circuitry is further operable to determine the power parameter by determining a third seek distance associated with executing a disk access command after executing the write command.

11. The disk drive as recited in claim 9, wherein the control circuitry is further operable to determine the power parameter based on an amount of the data in the write command.

12. The disk drive as recited in claim 1, wherein:
    each physical zone comprises at least one circular buffer; and
    the data is written to a data sector at a head of the circular buffer in the selected physical zone.

13. A method of operating a disk drive, the disk drive comprising a head actuated over a disk comprising a plurality of physical zones including a first physical zone and a second physical zone, wherein the first physical zone comprises data tracks recorded at a first data rate and the second physical zone comprises data tracks recorded at a second data rate different than the first data rate, the method comprising:
    receiving a write command including data and at least one logical block address (LBA);
    selecting one of the first and second physical zones based on a power parameter affecting a power consumption of the disk drive;
    writing the data to a data sector in the selected physical zone, wherein a physical block address (PBA) is assigned to the data sector; and
    updating an LBA to PBA map for the written data.

14. The method as recited in claim 13, wherein the power parameter comprises a high power mode and a low power mode, the method further comprising:
    selecting the first physical zone for the high power mode; and
    selecting the second physical zone for the low power mode in order to consume less power.

15. The method as recited in claim 14, wherein:
    the high power mode corresponds to a non-battery operating mode; and
    the low power mode corresponds to a battery operating mode.

16. The method as recited in claim 14, wherein the first data rate is higher than the second data rate.

17. The method as recited in claim 16, wherein:
    the first physical zone is located toward an outer diameter of the disk; and
    the second physical zone is located toward an inner diameter of the disk.

18. The method as recited in claim 13, further comprising determining the power parameter based on an amount of the data in the write command.

19. The method as recited in claim 13, further comprising determining the power parameter based on a seek distance of the head.

20. The method as recited in claim 13, further comprising determining the power parameter based on a seek profile of the head.

21. The method as recited in claim 19, further comprising determining the power parameter by:
    determining a first seek distance associated with writing the data to the first physical zone; and
    determining a second seek distance associated with writing the data to the second physical zone.

22. The method as recited in claim 21, further comprising determining the power parameter by determining a third seek distance associated with executing a disk access command after executing the write command.

23. The method as recited in claim 21, further comprising determining the power parameter based on an amount of the data in the write command.

24. The method as recited in claim 13, wherein:
    each physical zone comprises at least one circular buffer; and
    the data is written to a data sector at a head of the circular buffer in the selected physical zone.

* * * * *